United States Patent Office 3,385,887
Patented May 28, 1968

3,385,887
4-ISOBUTYLPHENYLACETIC ACID
John Stuart Nicholson and Stewart Sanders Adams, Nottingham, England, assignors to Boots Pure Drug Company Limited, Nottingham, England, a British company
No Drawing. Original application Jan. 22, 1962, Ser. No. 167,941, now Patent No. 3,228,831, dated Jan. 11, 1966. Divided and this application Oct. 21, 1965, Ser. No. 500,306
Claims priority, application Great Britain, Feb. 2, 1961, 3,999/61
1 Claim. (Cl. 260—515)

This invention relates to novel phenylalkane derivatives. More particularly it relates to novel substituted phenylacetic acids and derivatives thereof.

This application is divided from our copending application Ser. No. 167,941, now U.S. Patent 3,288,831, filed January 22, 1962.

We have discovered that the novel compounds of the present invention have valuable anti-inflammatory and/or analgesic and/or antipyretic activity. They are superior to acetylsalicylic acid in that they exhibit one or more of the following advantages:

(a) They are less toxic,
(b) They have a higher therapeutic ratio,
(c) They are more stable in the presence of water or water vapour,
(d) They are more soluble in water.

The alkali metal salts of the acids are particularly soluble in water and they are valuable for the preparation of oral compositions.

The active compounds of the present invention may be prepared by methods which are well known for the preparation of phenylacetic acids and derivatives thereof.

In general, the acids, their salts and the corresponding alcohols are the most active compounds followed by the esters. The invention therefore comprises new compounds falling within the general Formula I

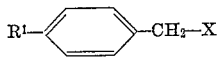

wherein $R^1$ is branched alkyl ($C_4$-$C_5$), cyclohexyl optionally substituted by alkyl ($C_1$-$C_2$) in the 1-position, or cycloheptyl; X is COOH, $CH_2OH$ or $COOR^2$ where $R^2$ is alkyl ($C_1$-$C_4$), and the non-toxic inorganic and organic salts of the acids, provided that $R^1$ is not t-butyl or unsubstituted cyclohexyl when X is COOH or $CH_2OH$ and provided that $R^2$ is not ethyl when $R^1$ is s-butyl, t-butyl or t-pentyl.

The invention also comprises processes for preparing the novel compounds of general Formula I. A list of methods suitable for preparing these compounds is given below. In these representations $R^1$ is as hereinbefore defined for general Formula I and Ph represents phenyl or phenylene.

Acids:

(1)
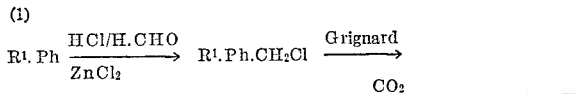

(2)
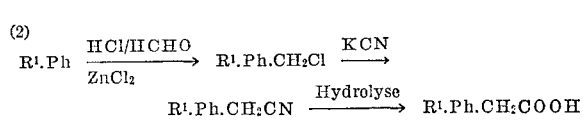

(3)
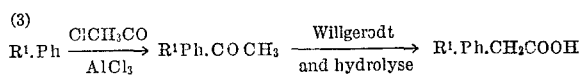

(4) $R^1.Ph.CH_2COOR^3 \xrightarrow{\text{Hydrolyse}} R^1.Ph.CH_2COOH$ ($R^3$ is alkyl, aryl or aralkyl.)

(5) Oxidation of corresponding alcohols and aldehydes.

Esters:

(1) $R^1.Ph.CH_2COOH + R^2OH \xrightarrow{H_2SO_4} R^1.Ph.CH_2COOR^2$ (2) $R^1.Ph.CH_2COOH \longrightarrow R^1.Ph.CH_2COCl \xrightarrow{R^2OH} R^1.Ph.CH_2COOR^2$ (3)
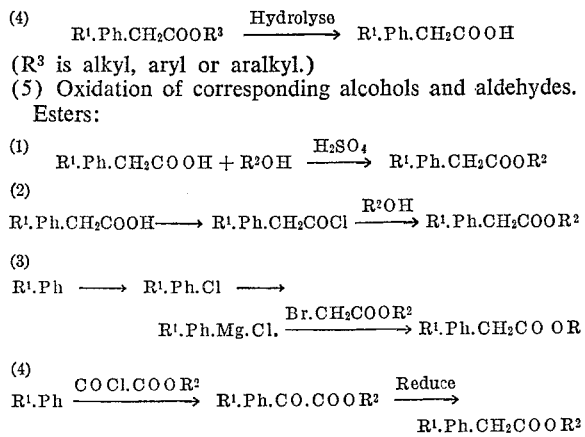

(4)
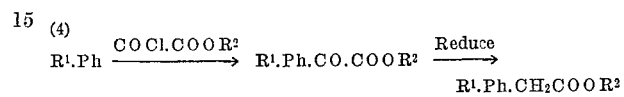

(5)
$R^1.Ph.CH_2COOH$ + dialkylaminoalkyl halide $\longrightarrow$ dialkylaminoalkyl ester hydrochloride ($R^2$ is alkyl or where possible substituted alkyl, e.g. diethylaminoethyl.)

Alcohols:

(1)
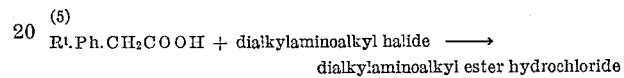

(2) $R^1.Ph.CH_2COOR^4 \xrightarrow{\text{Hydrogenate}} R^1.Ph.CH_2CH_2OH$ ($R^4$ is hydrogen or alkyl.)

The hydrogenation takes place in the presence of catalysts, e.g. $LiAlH_4$, or the ester is reduced with sodium to the alcohol (Bouveault-Blanc reaction).

Salts:
Salts of the acids can be made by reacting the acids with organic or inorganic bases.

The screening test which was used to detect anti-inflammatory activity was that described by Adams and Cobb, Nature, 1958, 181, 773.

Analgesic and antipyretic properties of the compounds were also assessed as were their toxicities on several types of animals, namely mice, rats, guinea pigs, cats and dogs. As is to be expected, the relative activities varied widely and for confirmation of the pharmacological activity in a clinical trial a compound having good all-round activity with low toxicity was chosen, namely 4-isobutylphenylacetic acid. The acute $LD_{50}$ for this compound with mice was 1300 mg./kg. orally and 600 mg./kg. I.P.; for rats the oral figure was greater than 1200 mg./kg. No toxic effects and no pathological changes were detected in rats fed daily on 200 mg./kg. of 4-isobutylphenylacetic acid for 8 weeks. Similarly no toxic effects were noted in dogs fed on 50 mg./kg. daily for 6 weeks.

The initial clinical trial was carried out in a controlled fashion using "double-blind" technique in which neither the patient nor the medical observer is aware of the drug being given during period of assessment. Twelve patients with acute rheumatoid arthritis involving multiple joints and with systemic febrile reaction were observed for a period of several weeks and complete symptomatic control was obtained with the oral administration of 30 grains daily of 4-isobutylphenylacetic acid in four divided doses. No toxic reactions were noted. The beneficial therapeutic effect of this treatment was indistinguishable from that obtained in the same patients with aspirin at a dose of 60 grains per day.

The evidence is that like aspirin the compounds of the present invention are useful in the treatment of (a)

painful inflammation of the joints and periarticular tissues as occurs in rheumatoid arthritis, Still's disease and osteoarthritis; (b) various types of non-specific inflammatory or rheumatic conditions affecting the fibromuscular tissues and connective tissue; (c) rheumatic fever and its sequelae.

The following non-limitative examples illustrate the invention.

Example 1

4-isobutylacetophenone (49.4 g.), sulfur (13.6 g.) and morpholine (38 ml.) were refluxed for 16 hours; concentrated hydrochloric acid (344 ml.) and glacial acetic acid (206 ml.) were added and the mixture was refluxed for a further 7 hours. The mixture was cooled, diluted with water and the oil which separated was isolated with ether. The ethereal solution was extracted into aqueous sodium carbonate from which the crude acid was precipitated by addition of hydrochloric acid. The crude acid was again isolated with ether, the solution washed with water and evaporated to dryness to give a crystalline residue. The residue was crystallised from light petroleum (B.P. 40–60° C.) to give 4-isobutylphenylacetic acid, M.P. 85.5–87.5° C. (Found: C, 75.1; H, 8.5. $C_{12}H_{16}O_2$ requires C, 75.0; H, 8.3%.)

The following compounds were made by the same method: 4-cycloheptylphenylacetic acid, M.P. 90.5–92.5° C. (Found: C, 77.3; H, 8.7. $C_{15}H_{20}O_2$ requires C, 77.6; H, 8.6%.)

4-(1-ethylpropyl)phenylacetic acid, B.P. 153–154° C./2.5 mm. (Found: C, 75.4; H,8.6. $C_{13}H_{18}O_2$ requires C, 75.8; H, 8.7%.)

4-(1,2-dimethylpropyl)phenylacetic acid, B.P. 156–157° C./2.5 mm. (Found: C, 75.5; H, 8.6. $C_{13}H_{18}O_2$ requires C, 75.8; H, 8.7%.)

4-(2,2-dimethylpropyl)phenylacetic acid, M.P. 110.5–111° C. (Found: C, 75.6; H, 8.5. $C_{13}H_{18}O_2$ requires C, 75.8; H, 8.7%.)

4-(2-methylbutyl)phenylacetic acid, M.P. 38–40° C. (Found: C, 75.5; H, 8.7. $C_{13}H_{18}O_2$ requires C, 75.8; H, 8.7%.)

4-(1-methylcyclohexyl)phenylacetic acid, B.P. 194–196° C./3 mm. (Found: C, 77.8; H, 8.4. $C_{15}H_{20}O_2$ requires C, 77.6; H, 8.6%.)

4-(1-ethylcyclohexyl)phenylacetic acid, B.P. 188° C./0.7 mm. (Found: C, 77.5; H, 8.2. $C_{16}H_{22}O_2$ requires C, 78.0; H, 8.9%.)

4 - isopentylphenylacetic acid, M.P. 62.5–63.5° C. (Found: C, 76.1; H, 8.6. $C_{13}H_{18}O_2$ requires C, 75.8; H, 8.7%.)

4-(1-methylbutyl)phenylacetic acid, B.P. 114° C./1.5 mm. (Found: C, 75.4; H, 8.6. $C_{13}H_{18}O_2$ requires C, 75.8; H, 8.7%.)

Example 2

4-s-butylacetophenone (40 g.), sulphur (11 g.) and morpholine (30 ml.) were refluxed for 16 hours, cooled, acetic acid (170 ml.) and concentrated hydrochloric acid (280 ml.) were added and the mixture was refluxed for a further 7 hours. The mixture was concentrated in vacuo to remove acetic acid and the concentrate was diluted with water. The oil which separated was isolated with ether, the ethereal solution was extracted with aqueous sodium carbonate and this extract was acidified with hydrochloric acid. The oil was isolated with ether, evaporated to dryness and the residue was esterified by refluxing with ethanol (100 ml.) and concentrated sulphuric acid (3 ml.) for 5 hours. The excess alcohol was distilled off, the residue was diluted with water and the oil which separated was isolated with ether. The ethereal solution was washed with sodium carbonate solution; then with water and was dried. The ether was evaporated off and the oil was distilled to give ethyl 4-s-butylphenyl-acetate, B.P. 114–116° C./1.5 mm. (Found: C, 76.4; H, 9.0. $C_{14}H_{20}O_2$ requires C, 76.4; H, 9.1%.)

Ethyl 4-s-butylphenylacetate (7.8 g.) was refluxed for 1 hour with sodium hydroxide solution (5 N, 10 ml.) and methanol (10 ml.), acidified with hydrochloric acid and the oil which separated was isolated with ether. The ethereal solution was washed with water, dried and distilled to give 4-s-butylphenylacetic acid, B.P. 134° C./0.5 mm. (Found: C, 74.9; H, 8.5. $C_{12}H_{16}O_2$ requires C, 75.0; H, 8.3%.)

In a similar manner the following compound was prepared from the appropriate ester.

4-t-pentylphenylacetic acid, B.P. 156° C./2.5 mm. (Found: C, 75.6; H, 8.6. $C_{13}H_{18}O_2$ requires C, 75.8; H, 8.7%.)

Example 3

4-t-butylphenylacetyl chloride (10.5 g.) was added dropwise to n-butanol (12 ml.) and the mixture was heated on the steam bath for 30 minutes. The product was distilled to give a colourless oil butyl 4-t-butylphenyl-acetate, B.P. 126° C./1 mm. (Found: C, 77.7; H, 9.6. $C_{16}H_{24}O_2$ requires C, 77.4; H, 9.7%.)

Similarly there was prepared:
Methyl 4-t-butylphenylacetate, B.P. 106° C./2.5 mm. (Found: C, 76.1; H, 8.8. $C_{13}H_{18}O_2$ requires C, 75.8; H, 8.7%.)

Isopropyl4-t-butylphenylacetate, B.P. 114° C./1.5 mm. (Found: C, 76.6; H, 9.2. $C_{15}H_{22}O_2$ requires C, 77.0; H, 9.4%.)

n-Propyl 4-t-butylphenylacetate, B.P. 112° C./1 mm. (Found: C, 76.9; H,9.5. $C_{15}H_{22}O_2$ requires C, 77.0; H, 9.4%).

Example 4

4-isobutylcyclohexanone (34.28 g.) A.R. zinc filings (16.0 g.) ethyl bromoacetate (26.5 ml.) and dry benzene (120 ml.) were warmed until a vigorous reaction set in which required external cooling. The mixture was then refluxed for 30 minutes, decomposed with ice cold dilute sulphuric acid, the benzene solution separated, washed with water, dried and evaporated. The residue (49 g.) dry pyridine (45 ml.) and dry ether (93 ml.) were stirred with ice cooling and thionyl chloride (26 ml.) added dropwise over 30 minutes, the temperature being held below 12° C. After stirring for 2 hours at 0° C., water was cautiously added to the reaction mixture, the ethereal solution was washed with water, dried and ethyl 4-isobutylcyclohex-1-enylacetate was distilled, B.P. 106–109° C./2 mm. (Found: C, 75.0; H, 10.4. $C_{14}H_{24}O_2$ requires C, 75.0; H, 10.7%.)

Ethyl 4-isobutylcyclohex-1-enylacetate (8.0 g.) and sulphur (2.7 g.) were heated at 210° C. for 5 hours, then at 240° C. for 2 hours. Copper powder (100 mg.) was added and the heating continued for 5 minutes; the mixture was cooled, diluted with ether, filtered and ethyl 4-isobutylphenylacetate was distilled, B.P. 110° C./1 mm. (Found: C, 76.7; H, 9.2. $C_{14}H_{20}O_2$ requires C, 76.4; H, 9.1%.)

Example 5

4-isobutylbenzyl chloride (50 g.), sodium cyanide (16.1 g.), alcohol (100 ml.), water (30 ml.) were refluxed and stirred for 5 hours. The alcohol was distilled, the oil isolated in ether, washed with water and distilled, B.P. 113° C./2 mm.

4-isobutylphenylacetonitrile (30 g.), alcohol (100 ml.), 5 N sodium hydroxide (60 ml.) were refluxed for 6 hours and the alcohol removed by distillation. The residue was acidified with dilute hydrochloric acid and the precipitate collected in ether, extracted with dilute sodium carbonate solution, and the extracts acidified with dilute hydrochloric acid. The crystalline precipitate of 4-isobutylphenylacetic acid was collected, washed with water, dried in vacuo and recrystallised from light petroleum.

Example 6

To an ice cold stirred solution of anhydrous aluminium chloride (40.0 g.) in nitrobenzene (125 ml.) was slowly added ethyl oxalyl chloride (27.4 g.) followed by the dropwise addition of isobutylbenzene (35 g.). After stirring for 5 hours at room temperature the mixture was decomposed with cracked ice, ether (200 ml.) added and the organic phase washed with sodium hydrogen carbonate solution, water and distilled, B.P. 155° C./3 mm.

Ethyl 4-isobutylphenylglyoxylate (11.0 g.) was hydrogenated at room temperature and 2 atmospheres of hydrogen in the presence of palladium black (1.0 g.) and glacial acetic acid (80 ml.). When absorption of hydrogen had ceased, perchloric acid (7 g. of 70%) was added and hydrogenation continued until absorption was complete. The filtrate from the catalyst was treated with aqueous sodium hydroxide to neutralise the perchloric acid and acetic acid was distilled in vacuo below 50° C. The residue was hydrolysed by refluxing and stirring with 2 N sodium hydroxide (50 ml.) for 6 hours, cooled and acidified with dilute hydrochloric acid, the precipitate of 4-isobutylphenylacetic acid collected, washed with water, dried in vacuo and recrystallised from light petroleum, B.P. 62–68° C.

Example 7

4-t-butylphenylacetic acid (1.35 g.) and benzylamine (0.75 g.) were mixed in ether (30 ml.) and the salt collected and recrystallised from absolute alcohol in colourless plates to give benzylamine 4-t-butylphenylacetate, M.P. 144–147° C. (Found: N, 4.8. $C_{19}H_{25}NO_2$ requires N, 4.7%.)

Example 8

N,N-diethylaminoethanol (10.0 g.) in dry ether (50 ml.) was added dropwise to a stirred solution of 4-t-butylphenylacetyl chloride (15.0 g.) in dry ether (100 ml.) at 0–5° C. After stirring for 1 hour at room temperature, water (20 ml.) was added and the ether extracted twice with 2 N hydrochloric acid. The aqueous solutions were combined, basified with 2 N sodium hydroxide and the oil was isolated in ether washed with water, dried and distilled, B.P. 156–160° C./1.5 mm., 8.5 g., 34%. It was re-distilled to give diethylaminoethyl 4-t-butylphenylacetate as a practically colourless liquid, B.P. 153–154° C./1.5 mm. (Found: N, 5.2. $C_{18}H_{29}NO_2$ requires N, 4.8%.)

Example 9

Ethyl 4-isobutylphenylacetate (15. g.) in dry ether (50 ml.) was added dropwise to a stirred solution of lithium aluminium hydride (3 g.) in ether (150 ml.). The mixture was refluxed for 1 hour, decomposed with dilute sulphuric acid, the ether was separated and washed with water, dried and distilled to give 2,4'-isobutylphenylethanol, B.P. 104° C./0.8 mm. (Found: C, 80.3; H, 10.2. $C_{12}H_{18}O$ requires C, 80.9; H, 10.1%.)

Example 10

4-isobutylphenylacetic acid (75 g.), absolute alcohol (500 ml.) and concentrated sulphuric acid (15 ml.) were refluxed for 4 hours. Excess alcohol was distilled in vacuo, the residue diluted with water and the ester was isolated in ether, washed with sodium carbonate solution, then water before being dried and distilled to give ethyl 4-isobutylphenylacetate, B.P. 108–110° C./0.6 mm. (Found: C, 76.7; H, 9.2. $C_{14}H_{20}O_2$ requires C, 76.4; H, 9.1%.)

In the same manner the following compound was made:
Ethyl 4-cyclohexylphenylacetate, B.P. 140° C./1 mm. (Found: C, 78.5; H, 9.2. $C_{16}H_{22}O_2$ requires C, 78.0; H, 8.9%.)

What we claim is.
1. 4-isobutylphenylacetic acid.

References Cited

Corse et al.: Jour. Am. Chem. Soc., vol. 70, pp. 2837–2843 (1948).

Tchitchibabin et al.: Bull. Soc. Chim. de France 43, pp. 238–242 (1928).

LORRAINE A. WEINBERGER, *Primary Examiner.*

T. L. GALLOWAY, *Assistant Examiner.*